March 14, 1950 D. H. HALENZA 2,500,750
FLUID CONTROL UNIT
Filed Jan. 13, 1944
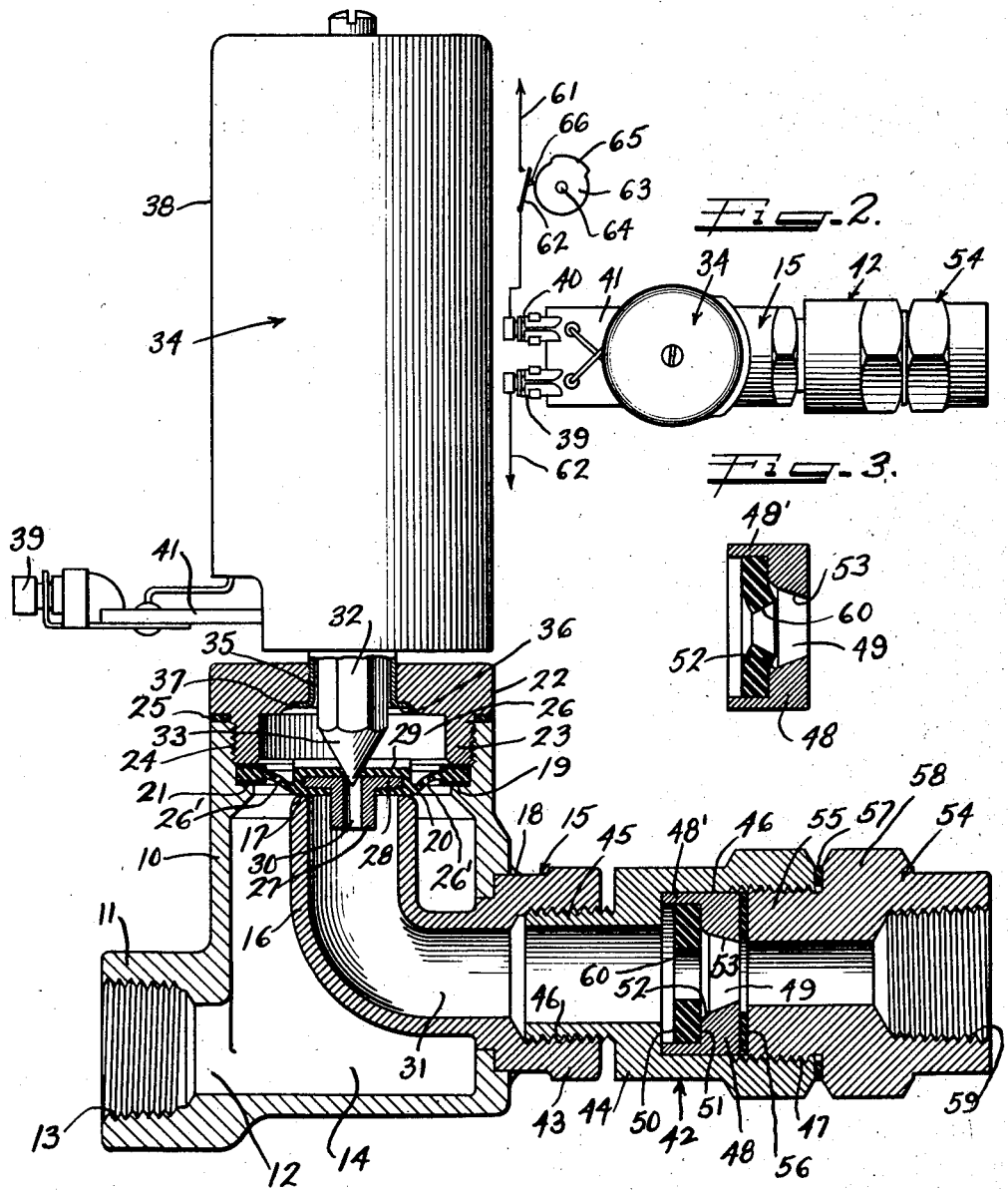
Inventor
DONALD H. HALENZA.

Patented Mar. 14, 1950

2,500,750

UNITED STATES PATENT OFFICE 2,500,750

FLUID CONTROL UNIT

Donald H. Halenza, Chicago, Ill., assignor to Dole Valve Company, Chicago, Ill., a corporation of Illinois Application January 13, 1944, Serial No. 518,055

6 Claims. (Cl. 137—69)

This invention relates to a fluid control unit and more particularly to a combination shut-off valve and automatic constant flow maintaining means.

In many fluid systems, such as the fluid system of a dish washing machine, it is desirable to provide a simple and compact unit for controlling the flow of fluid delivered to the washing tub or container as well as to provide means for maintaining a constant rate of fluid flow irrespective of variation in pressure in the supply duct or in the tub.

One of the features of the present invention is to provide novel means for controlling the flow of fluid through ducts or conduits as well as to provide means in combination therewith for automatically maintaining a constant rate of fluid delivery irrespective of variation in pressure within the system.

It is an object of the present invention to provide a novel fluid control unit.

It is a further object of the present invention to provide a novel compact unit including a shut-off valve and an automatic flow maintaining device which is economical to manufacture and which is rugged and reliable in use.

Another object of the present invention is to provide a novel fluid control unit including a diaphragm type shut-off valve in combination with a resilient annulus type of flow control device.

Another and further object of the present invention is to provide a fluid control unit including a diaphragm shut-off valve and a quickly detachable automatic constant flow maintaining device.

The novel features which are believed to be characteristic of my invention are set forth with particularity in the appended claims. My invention itself, however, both as to its organization, method of operation and manner of construction, together with further objects and advantages thereof, may best be understood by reference to the accompanying drawing, in which:

Figure 1 is an elevational view partly in section of a fluid control unit embodying the novel features of the present invention;

Figure 2 is a plan view on reduced scale of the fluid control unit shown in Figure 1; and Figure 3 is a sectional view of the flow control insert with its associated flow ring flexed by a fluid pressure drop thereacross.

Referring now to the illustrated embodiment of the invention there is shown in Figures 1 and 2 a fluid control unit comprising a main housing member 10 in the form of a casting having a boss 11 containing an inlet duct 12 which is internally threaded as at 13 for connection with a suitable fluid supply pipe (not shown). The casting 10 has a main fluid inlet chamber 14 which is in direct communication with the inlet duct 12.

A female elbow 15 extends through the wall of the casting 10 into the chamber 14, the inner portion 16 of the elbow 15 being disposed to extend upwardly in the center of the chamber 14. As will presently be explained, the upper end 17 of the portion 16 acts as a valve seat. The elbow 15 is preferably soldered as at 18 to the wall of the casting 10 so as to form a fluidtight connection. An inwardly extending shoulder 19 is provided on the upper interior wall of the casting 10 opposite the upper end 17 of the elbow 15. A flexible diaphragm 20 having a reinforced marginal edge 21 is seated on the shoulder 19. A cap or top closure member 22 having a threaded sleeve portion 23 is threaded into the upper internally threaded top portion 24 of the casting 10. The sleeve portion 23 is of such length as to extend down into engagement with the reinforced marginal portion 21 of the diaphragm 20 to hold the same in tight engagement with the shoulder 19. The cap 22 is preferably provided with a gasket or washer 25 in order that it may form a fluid tight connection with the casting 10.

As will be apparent from an inspection of Figure 1 of the drawings, the sleeve portion 23 of the cap 22 provides an upper fluid chamber 26 above the diaphragm 20. One or more bleeder holes 26' are provided in the diaphragm 20 to permit a small quantity of fluid from the fluid inlet chamber 14 to be bled into the upper chamber 26.

The central portion of the diaphragm 20 is reinforced by a metal plug or eyelet 27 which plug has a base portion 28 embedded directly in the somewhat thickened central portion 29 of the flexible diaphragm 20. This diaphragm 20 may be made of any suitable flexible material such as rubber or the like. The central portion 29 of the diaphragm 20 and the plug 27 are centrally apertured as at 30 to provide a direct fluid passageway from the upper chamber 26 to the outlet duct 31 of the elbow 15. The cross-sectional area of this passageway 30 is preferably slightly greater than the combined area of all of the small bleeder holes 26' in the diaphragm 20. It will thus be apparent from an inspection of Figure 1 of the drawing that when the passageway 30 is open and free to conduct fluid from the upper chamber 26 into the outlet duct 31, fluid will flow out of the upper chamber 26 through the passageway 30 faster than it can flow into the bleeder holes 26'. It will further be apparent that under such circumstances the pressure on the under side of the diaphragm 20 between the seat 17 of the elbow portion 16 and the shoulder 19 is greater than the fluid pressure exerted on the top of the diaphragm and the diaphragm will be lifted up off of the seat 17 to permit the passage of fluid from the inlet chamber 14 into the elbow portion 16 containing the outlet duct 31.

If the passageway 30 should now be blocked off, fluid from the high pressure inlet chamber 14 would flow through the holes 26' and fill the upper chamber 26 with fluid under pressure. The fluid pressure on the upper surface of the diaphragm will now be greater than that exerted on the lower surface due to the fact that the central portion of the under surface of the diaphragm opposite the upper end of the elbow 16 would be at a lower pressure than that on the under surface of the diaphragm between the elbow portion 16 and the shoulder 19. The diaphragm 20 under such circumstances would move to its lower position against the upper end 17 of the elbow 16. From the above description it will be clear that the central reinforced section of the diaphragm 20 acts directly as a valve for opening and closing the upper end of the passageway 31 in the elbow portion 16.

The manner in which the fluid passageway 30 in the central section 29 and the plug 27 is closed off and opened will now be described. More particularly, the passageway 30 is closed by a solenoid actuated pilot valve member 32 provided with a lower tapered or pointed end portion 33, the tip of which is arranged to extend into the upper end of the passageway 30 and block the same off when the pilot valve member 32 is in its lower position. This pilot valve member 32 in effect is the armature of an electro-magnet 34 mounted on the top of the cap 22. In order that fluid may not escape into the electrical winding of the electro-magnet 34 from the upper chamber 26, a sleeve 35, closed at its upper end (not shown), is mounted in the cap 22. The lower end of this sleeve 35 is preferably provided with a flange 36 which is soldered to the inner surface of cap 22 as at 37. This sleeve 35 extends substantially entirely through the electro-magnet 34 and is of such a diameter as to permit the pilot valve or armature 32 to seat loosely therein.

The detailed construction of the electro-magnet 34 forms no part of the present invention, it being sufficient to say that it includes an electric coil (not shown) contained within an outer shell or casing 38 and is provided with a pair of terminals 39 and 40 mounted on a terminal block 41. When the electro-magnet 34 is energized through its terminals 39 and 40, the pilot valve or armature 32 is drawn up into the sleeve 35 away from the diaphragm 20. When the electro-magnet 34 is de-energized, the pilot valve or armature 32 drops down into engagement with the diaphragm 20 to close off the upper end of the passageway 30. It will thus be understood that when the electro-magnet 34 is energized, the fluid pressure in the inlet chamber 14 causes the diaphragm 20 to be raised thus permitting fluid in the inlet chamber 14 to flow through the outlet duct 31 in the elbow 15. When the electro-magnet 34 is de-energized, the passageway 30 is closed by the pilot valve 32 and the diaphragm closes off the outlet duct 31 from communication with the inlet chamber 14.

A constant flow maintaining device 42 is arranged to be quickly attached and disconnected from the female end 43 of the elbow 15. This constant flow maintaining device 42 includes a coupling 44 having a reduced externally threaded sleeve portion 45 which is threaded into the internally threaded bore 46 of the elbow 15. The other end of the coupling 44 has a relatively large well or recess 46 which is partially threaded as at 47. An insert 48 having a central opening 49 therein is disposed in the inner end of the recess 46. This insert 48 has an annular axially extending flange 48' in which is disposed a resilient washer or annulus 50. The annulus 50 is seated against a shoulder 51 which extends radially outwardly away from the inner end of the opening 49 in the insert 48. The opening 49 is formed of two frusto-conical surfaces 52 and 53, the surface 52 having a greater angle of convergence than the surface 53.

The insert 48 is retained in place by a connector 54 having a threaded male portion 55 which screws into the end of the threaded portion 47 of the coupling 44. A gasket or washer 56 is disposed between the end of the male portion 55 and the insert 48. A second washer or gasket 57 is disposed between the collar portion 58 of the connector 54 and the end of the coupling 44. The outer end of the connector 54 is internally threaded as at 59 for connection to a supply pipe or other connecting conduit.

The arrangement of the insert 48 and the resilient annulus 50 is such that when the fluid pressure on the left side of the annulus 50 is greater than the fluid pressure on the right side of the annulus, the annulus is deformed as shown in Figure 3. This deformation causes a constriction of the left-hand end of the passageway 60 through the annulus 50 and thus effectively acts as a metering orifice by reducing the size of the orifice as the velocity of the fluid increases. The extent of deformation of the annulus 50 has been found to be a function of the pressure drop across the annulus 50. The greater the pressure drop the smaller will be the effective cross-sectional area of the passageway 60. By shaping the shoulder 51 and the two frusto-conical surfaces 52 and 53 in the manner shown in Figure 1, it has been found that a constant rate of fluid delivery from the connector 54 will be had irrespective of changes and fluctuations in the pressure drop across the annulus 50.

The electro-magnet 34 of the above described fluid control device is preferably energized from a pair of supply conductors 61 and 62 through a timer driven cam operated switch 62, the switch being closed by means of a cam disk 63 mounted on a timer shaft 64 which in turn is driven by a timer (not shown). When the high point 65 of the cam disk 63 engages the cam follower 66 of the switch 62, the switch is closed. The length of time which the switch 62 remains closed depends upon the circumferential length of the raised portion 65 of the cam disk 63. If the flow control device is arranged to deliver one gallon of water a minute, it will readily be apparent that for a tub requiring a total of three gallons the raised portion 65 of the cam 63 is so dimensioned as to cause the electro-magnet 34 to remain energized for three minutes, this would then deliver a total volume of three gallons of fluid irrespective of any variations in the fluid pressure in the system.

Similarly if the flow control device is arranged to deliver three gallons of fluid per minute and seven gallons were desired, it would be necessary to cause the electromagnet 34 to remain energized for two and a third minutes.

While the above described fluid control unit has a wide field of application, it has been found particularly effective in dish washing apparatus. The particular physical construction of the unit has also been found to be particularly efficient in operation and economical to manufacture. The portions of the unit which might from time to time require a replacement such, for example, as the resilient annulus 50 and the flexible diaphrgm 20 may be readily reached and removed by the quick disconnect arrangement of the various elements of the unit.

It has been found in practice that the operation of a diaphragm type shut-off valve is greatly improved by the use, in conjunction therewith, of a constant flow control device. Indeed, it has been found, under some circumstances, that the diaphragm valve, by itself, will not remain closed even though the central orifice is closed off by the pilot valve. Under the same circumstances, the same pilot valve worked efficiently and well when employed in conjunction with a flow control device. It is believed that the reason for this is due to the fact that the flow control device tends to reduce the velocity head at the diaphragm.

While I have shown a particular embodiment of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. A fluid control unit for controlling the passage of a fluid therethrough, comprising fluid operated means for interrupting the flow of fluid through said unit, and resilient annular means operative when fluid is flowing through said unit tending to maintain a substantially constant rate of fluid delivery irrespective of variations in pressure drop across said unit.

2. A fluid control unit for controlling the passage of a fluid therethrough, comprising a diaphragm shut-off valve, and deformable annular means on the outlet side of said shut-off valve for metering the fluid to tend to deliver equal quantities of fluid in equal intervals of time.

3. A fluid control unit for controlling the passage of a fluid therethrough comprising a solenoid controlled pilot operated diaphragm shut-off valve, and a resilient deformable annulus having its central opening forming a metering orifice disposed in the path of fluid flow on the downstream side of the shut-off valve and supported only in a region adjacent its outer edge whereby the size of the orifice is reduced as the velocity of the fluid increases.

4. A fluid control unit for controlling the passage of a fluid therethrough comprising a first housing containing a shut-off valve operated by the flow of fluid through the unit, and a second housing containing a constant rate of flow maintaining device comprising a deformable annulus forming a metering orifice by reducing the size of the orifice as the velocity of the fluid increases, said second housing being detachably secured to and carried by said first housing.

5. A fluid control unit comprising a housing, a flexible diaphragm extending across the interior of said housing and dividing said housing into a first chamber and a second chamber, said housing having a fluid inlet duct communicating with said first chamber, an outlet pipe extending through a wall of said housing and projecting into said first chamber, the inner end of said pipe being disposed in close proximity to a central portion of said diaphragm and arranged to be closed by the same, a bleeder passageway communicating said second chamber with said first chamber, said diaphragm having an opening through its central portion over the end of said pipe, means for opening and closing said central opening in said diaphragm, a pipe coupling connected to the outer end of said outlet pipe, said pipe coupling having a cylindrical socket at one end thereof with a shoulder at the inner end of said socket, a slidably removable member in said socket having a transverse wall portion with a central opening therethrough and an outer axially extending lip seated on said shoulder, a resilient annulus forming a metering orifice within said lip against said transverse wall portion, the central opening of said annulus being smaller than the end of said transverse wall opening adjacent said annulus, and means for retaining said slidably removable member in said socket.

6. A fluid control unit comprising a housing, a flexible diaphragm extending across the interior of said housing and dividing said housing into a first chamber and a second chamber, said housing having a fluid inlet duct communicating with said first chamber, a female elbow extending through a wall of said housing and projecting into said first chamber, the inner end of said elbow being disposed in close proximity to a central portion of said diaphragm and arranged to be closed off by said diaphragm, a plurality of bleeder openings through said diaphragm communicating said second chamber with said first chamber, said diaphragm having a central opening over the end of said elbow, valve means for opening and closing said central opening in said diaphragm, a pipe coupling inserted into the outer end of said female elbow and having a cylindrical socket at its opposite end, said socket having a shoulder at the inner end thereof, a slidably fitting member in said socket having a transverse wall portion with a central opening therethrough and an outer axially extending lip seated on said shoulder, an annular disk of resilient material having a central opening therethrough forming a metering orifice and seated within said lip and against said transverse wall portion, the central opening in said disk being smaller than the end of said transverse wall opening adjacent said disk, and a connector threaded into said socket to hold the member in place.

DONALD H. HALENZA.

REFERENCES CITED

The following references are of record in the file of this patent:

UNITED STATES PATENTS

| Number | Name | Date |
|---|---|---|
| 1,165,913 | Shanks | Dec. 28, 1915 |
| 1,262,225 | Meyer | Apr. 9, 1918 |
| 1,714,573 | Sloan | May 28, 1929 |
| 1,800,352 | Klees | Apr. 14, 1931 |
| 2,012,162 | Furlong | Aug. 20, 1935 |
| 2,062,341 | Wells | Dec. 1, 1936 |
| 2,160,757 | Schulhoff | May 30, 1939 |
| 2,305,151 | Fields | Dec. 15, 1942 |
| 2,318,236 | Layton | May 4, 1943 |
| 2,319,514 | Penfield | May 18, 1943 |

FOREIGN PATENTS

| Number | Country | Date |
|---|---|---|
| 372,286 | Great Britain | May 2, 1932 |